United States Patent [19]
Walsh

[11] Patent Number: 5,848,566
[45] Date of Patent: Dec. 15, 1998

[54] CONNECTING PIN CLIP

[75] Inventor: Warren J. Walsh, Buffalo, Minn.

[73] Assignee: Wagner Spray Tech Corporation, Minneapolis, Minn.

[21] Appl. No.: 848,712

[22] Filed: Apr. 16, 1997

Related U.S. Application Data

[63] Continuation of Ser. No. 561,292, Nov. 21, 1995, abandoned.

[51] Int. Cl.⁶ ...................................................... F01B 29/00
[52] U.S. Cl. ............................................................... 92/128
[58] Field of Search ....................................... 92/128, 129

[56]         References Cited

U.S. PATENT DOCUMENTS

| | | | |
|---|---|---|---|
| 1,725,720 | 8/1929 | Pedersen | 92/129 X |
| 2,739,000 | 3/1956 | Muirhead | 287/108 |
| 3,771,907 | 11/1973 | Neumann et al. | 92/128 X |
| 4,430,928 | 2/1984 | Magnarelli et al. | 92/128 X |
| 4,930,405 | 6/1990 | Lilie | 92/128 |
| 5,228,842 | 7/1993 | Guebeli | 417/360 |
| 5,367,945 | 11/1994 | Halka et al. | 92/128 X |
| 5,499,571 | 3/1996 | Dreiman | 92/128 X |

FOREIGN PATENT DOCUMENTS

| | | |
|---|---|---|
| 343 365 C | 12/1920 | Germany . |
| 58-124074 | 7/1983 | Japan ........................ 92/129 |
| 2 171 775 | 9/1986 | United Kingdom . |

*Primary Examiner*—Hoang Nguyen
*Attorney, Agent, or Firm*—Faegre & Benson LLP

[57]                 ABSTRACT

A connecting pin clip for retaining a solid cylindrical connecting pin in aligned transverse bores in a driving member and paint pump piston, formed out of stainless steel spring wire and having a linear mediate portion connected to two end portions, each of which have a linear section extending generally perpendicularly away from the mediate portion and ending in opposed convex shapes. The clip is resiliently deformable for installation and removal over a portion of the driving member to retain the pin by engagement of the ends of the clip with the ends of the pin which are preferably recessed from the ends of the bore in the driving member.

14 Claims, 2 Drawing Sheets

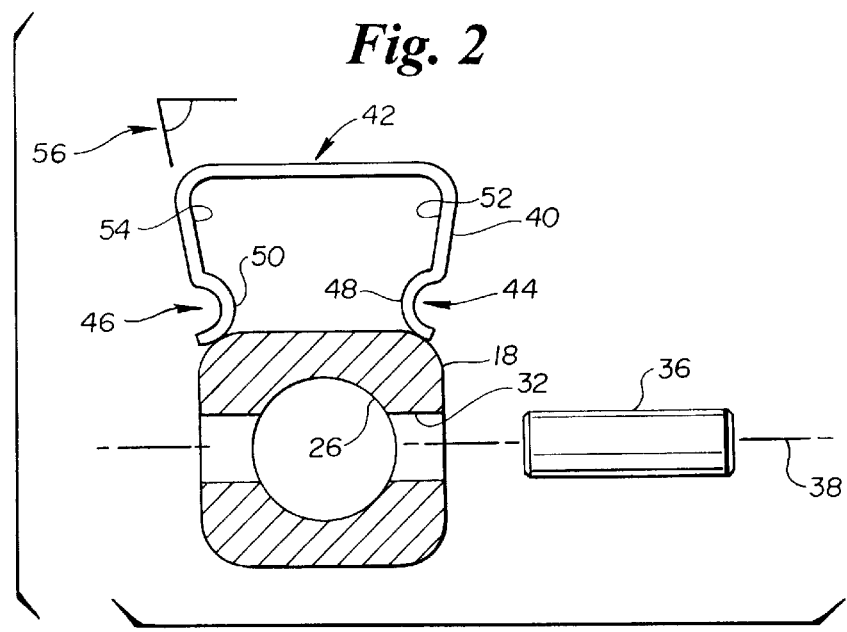
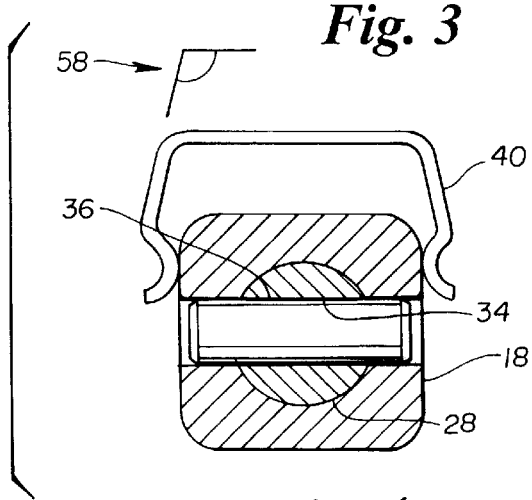
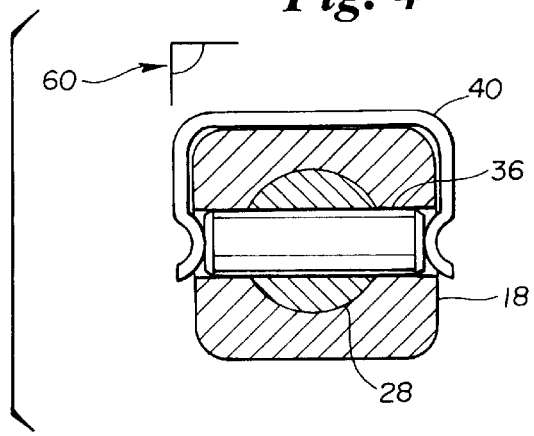

CONNECTING PIN CLIP

This application is a continuation of application Ser. No. 08/561,292, filed on Nov. 21, 1995 abandoned.

FIELD OF THE INVENTION

This invention relates to the field of mechanisms to connect removable and replaceable pumping sections with driving members of portable piston paint pumps, particularly of the type useful in airless spray painting applications.

BACKGROUND OF THE INVENTION

In the past, it has been known to use a connecting pin to connect a reciprocating member, such as a slide or yoke, to a piston for pumping paint. One example is shown in U.S. Pat. No. 5,228,842, Quick-Change Fluid Section for Piston-Type Paint Pumps. In that prior art system, a wire retaining ring was received in a circumferential slot in a slide to hold the connecting pin in aligned transverse bores in the slide and piston. To remove the fluid section, it was necessary to move the wire ring out of the slot to permit extraction of the connecting pin.

The present invention overcomes the difficulty of moving a wire ring out of a circumferential slot by providing a connecting pin clip which does not require such a circumferential slot.

BRIEF DESCRIPTION OF THE DRAWINGS

FIG. 2 is a simplified section view of the driving member taken along line 2—2 of FIG. 1 with the connecting pin and clip shown exploded.

FIG. 3 is a simplified view similar to that of FIG. 2, but with the connecting pin installed in aligned transverse bores in the driving member and piston and with the clip partially received on the driving member.

FIG. 4 is a simplified view similar to that of FIG. 3, but with the connecting pin clip fully installed and retaining the connecting pin in the aligned transverse bores of the driving member and piston.

DETAILED DESCRIPTION

Figure 1:
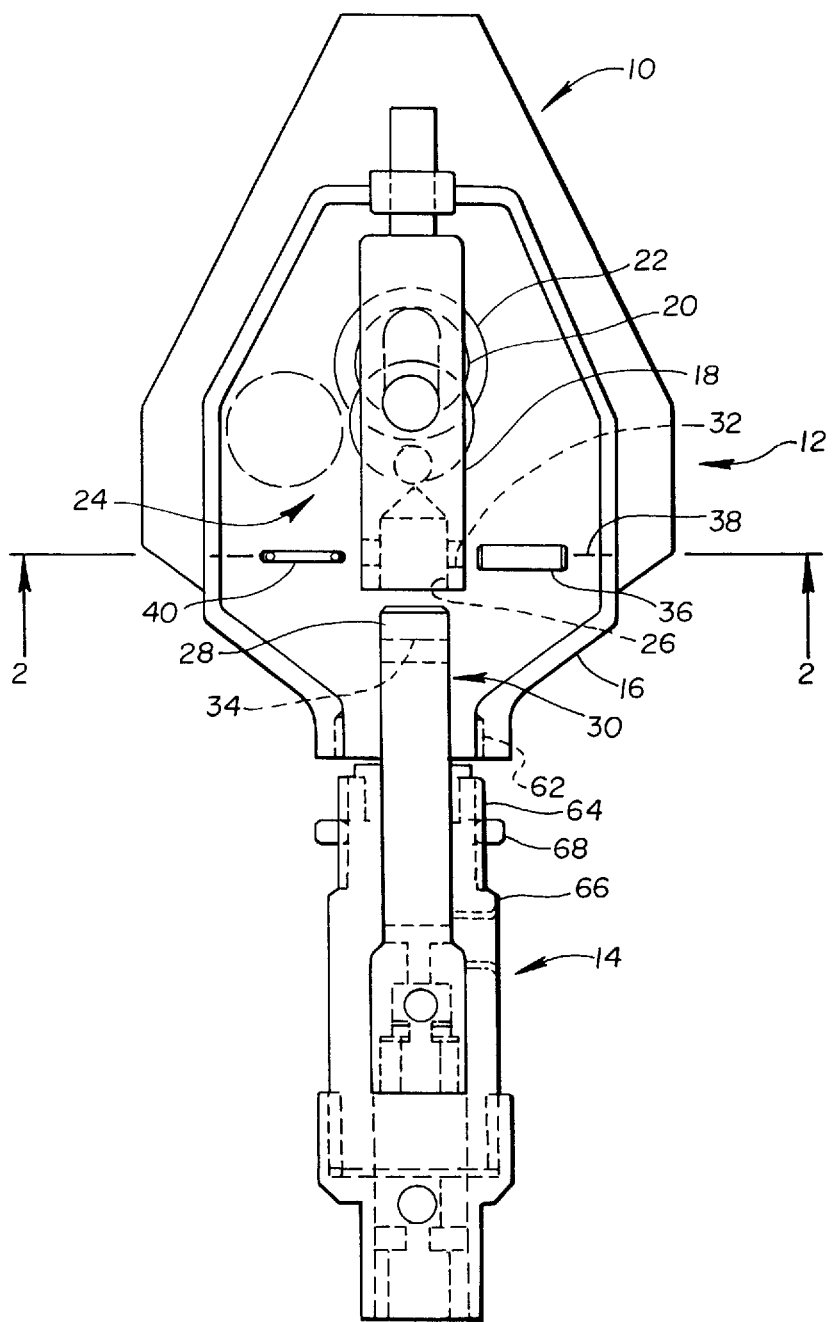
FIG. 1 is a simplified end view of a portion of a portable piston paint pump showing the fluid section separated from the driving member and associated parts.

Referring now to the FIGS., and most particularly to FIG. 1, a simplified view of a portable piston paint pump assembly 10 may be seen. Pump assembly 10 includes a driving assembly 12 and a fluid section 14. Driving assembly 12 has a housing 16 containing a driving member 18, which may be in the form of a Scotch yoke. Member 18 is driven by an eccentric 20 received in a reciprocating bushing 22, and is powered through a gear train 24, shown in simplified form.

Referring now also to FIGS. 2–4, driving member 18 preferably has a longitudinal bore 26 sized to receive the end 28 of a piston 30. Each of member 18 and piston 30 have transverse bores 32, 34, respectively, which are aligned when end 28 of piston 30 is received in the longitudinal bore 26 of driving member 18.

A connecting pin 36 is received in aligned bores 32, 34 along axis 38 and retains the piston 30 to the driving member 18, while also permitting disassembly therebetween when desired, as, for example when it is desired to service the fluid section 14. During normal operation however, it is necessary to retain pin 36 in bores 32, 34. A connecting pin clip 40 retains the pin 36 in bores 32, 34 when installed as shown in FIG. 4.

Clip 40 preferably has a linear mediate portion 42 and first and second end portions 44, 46 respectively, each of which is formed generally at a right angle to the mediate portion. Each end portion has a convex shape or arcuate curve 48, 50 at the respective tips thereof, with the convex portions 48, 50 facing each other. End portions 44, 46 each preferably have a linear section 52, 54 respectively between the mediate portion 42 and the respective convex portion 48, 50.

To assemble the fluid section 14 to the driving assembly 12, the piston 30 is inserted into the driving member 18 longitudinally and the bore 34 in the piston 30 is aligned with the bore 32 in the driving member 18. The connecting pin 36 is then inserted into aligned bores 32, 34. Clip 40 is positioned adjacent member 18 as shown in FIG. 2, and urged transversely against member 18 until the opposed end portions 44, 46 spring apart as shown in FIG. 3, allowing the clip to be displaced transversely perpendicularly to the axis 38 of pin 36 and bores 32, 34. Clip 40 will assume the shape shown in FIG. 4 when fully installed, retaining pin 36 by contact with the convex shapes 48, 50 The fluid section 14 can be detached and reattached to the driving assembly 12 via mating threads 62, 64 on the driving assembly housing 16 and the fluid section housing 66, respectively.

In its relaxed state, as shown in FIG. 2, clip 40 preferably has end portions 44, 46 each forming a slight acute angle 56 with respect to the mediate portion which is shown parallel to axis 38. As clip 40 is being installed, end portions 44, 46 each preferably form a slight obtuse angle 58 with respect to the mediate portion, as shown in FIG. 3. Once installed, the end portions 44, 46 each preferably form approximately a right angle 60 with respect to the mediate portion 42, as shown in FIG. 4. The material used to form clip 40 is preferably a 0.062 inches diameter type 303 or 304 stainless steel spring wire. In one embodiment, the length of the linear mediate portion is 0.938 inches, the acute angle 56 is 80 degrees, the radius of each convex shape (and each of the other curves in the clip) is 0.156 inches and the length of the linear section to the mid point of the convex shape is 0.480 inches. Such an embodiment has been found useful to retain a connecting pin 36 of 0.312 inches diameter and 0.970 inches length when the driving member 18 has a generally square cross-section of 1.09 inches in the transverse directions parallel and perpendicular to the axis 38. When the clip 40 and driving member 18 having these dimensions are assembled together, there will be a nominal 0.075 inch clearance between the mediate portion 42 of the wire clip 40 and the nearest side of the driving member 18, as shown in FIG. 4. Such a clearance will allow for easier insertion and removal of clip 40 on driving member 18, and will allow for tolerance variations of the various parts.

The invention is not to be taken as limited to all of the details thereof as modifications and variations thereof may be made without departing from the spirit or scope of the invention. For example, the material of the clip could be made out of material other than stainless steel, or even non-metal, provided that it can be made to withstand the environment of a portable paint sprayer in which it must function. Furthermore, one or both ends of the clip could be made other than convex, provided that the clip retains the pin and is easily removable and insertable to allow disassembly and reassembly of the fluid section to the driving assembly.

What is claimed is:

1. A clip for connecting a paint pump piston to a reciprocating driving member via a connecting pin slideably received in aligned transverse bores in the piston and driving members the clip comprising a wire member having a resilient mediate portion and first and second end portions connected together by said mediate portion wherein at least one of said first and second end portions has a convex shape facing the other of said first and second end portions, and further wherein the first and second end portions are spaced apart a predetermined distance slightly less than a length of the connecting pin and the mediate portion is sized to encompass the piston and driving member and retain the connecting pin in the aligned transverse bores of the piston and driving member.

2. The clip of claim 1 wherein the mediate portion is generally linear.

3. The clip of claim 1 wherein the first and second end portions are each formed generally at a right angle to the mediate portion.

4. The clip of claim 3 wherein the other of the first and second end portions has a convex shape facing the convex shape of the one of the first and second end portions.

5. The clip of claim 1 wherein the wire member is formed of metal.

6. The clip of claim 5 wherein the metal is stainless steel.

7. A method of retaining a paint pump piston to a reciprocating driving member comprising the steps of:
  a. receiving an end of a piston in a mating end of a driving member where the ends of the piston and driving member each have a transverse bore therethrough;
  b. aligning the transverse bore of the piston with the transverse bore of the driving member;
  c. inserting a connecting pin into the aligned transverse bores of the piston and driving member; and
  d. moving a resilient clip adjacent the connecting pin such that the pin is retained in the transverse bores by the resilient clip wherein the clip is a wire member having a resilient mediate portion and first and second end portions connected together by said mediate portion and further wherein at least one of said first and second end portions has a convex shape facing the other of said first and second end portions, and still further wherein the first and second end portions are spaced apart a predetermined distance slightly less than a length of the connecting pin and the mediate portion is sized to encompass the piston and driving member and retain the connecting pin in the aligned transverse bores of the piston and driving member.

8. The method of claim 7 wherein the resilient clip has a mediate portion and first and second end portions with the first and second end portions spaced apart a predetermined distance slightly less than a length of the connecting pin and the mediate portion is sized to encompass the piston and driving member and retain the connecting pin in the aligned transverse bores of the piston and driving member.'

9. The method of claim 8 wherein step d. further comprises expanding the retaining clip by moving the first and second ends apart a distance sufficient to clear a transverse width of the driving member.

10. The method of claim 8 wherein step d. further comprises moving the clip until the first and second end portions are received in opposite ends of the transverse bore in the driving member.

11. A connecting pin clip for securing a connecting pin between aligned transverse bores in a paint pump piston and driving member, the clip comprising a resilient wire member having:
  a. a generally linear mediate portion; and
  b. first and second end portions each connected at opposite ends of the mediate portion and each having a generally arcuate curve at the tip thereof
wherein the mediate portion is sized to generally match the combined width of the piston and driving member and further wherein each of the first and second end portions project away from the mediate portion a distance sufficient for the arcuate curves to be received in the aligned transverse bores in the piston and driving member to retain the pin therein.

12. The clip of claim 11 wherein each end portion further comprises a generally linear section between the mediate portion and the arcuate curve at the tip thereof.

13. In a piston pump assembly of the type having a reciprocating driving member and a piston for pumping paint wherein the driving member is connected to the piston via a connecting pin received in aligned transverse bores in the driving member and piston, the improvement in combination therewith comprising a wire clip member having a mediate portion and first and second end portions connected together by said mediate portion and wherein at least one of the end portions has a projection directed towards the other end portion and further wherein the first and second end portions are spaced apart a predetermined distance sufficient to at least partially encompass the piston and driving member and retain the connecting pin in the aligned transverse bores thereof and wherein the driving member surrounds the piston and further wherein the driving member has two opposed flat sides, each perpendicular to the bore therethrough.

14. The improvement of claim 13 wherein the driving member surrounds the piston and further wherein the driving member has two opposed flat sides, each perpendicular to the bore therethrough.

\* \* \* \* \*